United States Patent [19]

Vranish

[11] Patent Number: 5,174,772
[45] Date of Patent: Dec. 29, 1992

[54] WORK ATTACHMENT MECHANISM/WORK ATTACHMENT FIXTURE

[75] Inventor: John M. Vranish, Crofton, Md.

[73] Assignee: The United States of America as represented by the Administrator of the National Aeronautics & Space Administration, Washington, D.C.

[21] Appl. No.: 824,126

[22] Filed: Jan. 22, 1992

[51] Int. Cl.$^5$ ............................................. H01R 13/54
[52] U.S. Cl. ................................... 439/131; 439/139; 439/310
[58] Field of Search ............... 439/310, 131, 135, 136, 439/137, 139; 483/3, 901; 403/322, 325, 330

[56] References Cited

U.S. PATENT DOCUMENTS

| | | | |
|---|---|---|---|
| 2,986,612 | 5/1961 | Healy | 439/135 X |
| 3,891,292 | 6/1975 | Blight et al. | 439/135 |
| 4,636,135 | 1/1987 | Bancon | 483/901 X |
| 4,710,093 | 12/1987 | Zimmer et al. | 414/730 |

Primary Examiner—Larry I. Schwartz
Assistant Examiner—J. R. Daulton
Attorney, Agent, or Firm—R. Dennis Marchant; Guy M. Miller; Paul S. Clohan, Jr.

[57] ABSTRACT

A mechanical coupling system wherein a spline screw system is used to connect two bodies, a work attachment mechanism and a work attachment fixture. A kinematic clamp first guides and mates the attachment mechanism to the attachment fixture. The kinematic clamp includes three round roller members equidistantly located around the periphery of the bodies and three correspondingly located V-shaped grooves located on the periphery of the other body. A motor driven spline screw in the attachment mechanism then engages a spline bolt head in the attachment fixture and includes a threaded shank upon which is mounted a translatable nut which is adapted to translate up and down the shank but not rotate. The nut carries one or more electrical connectors which travel upwardly during a connecting sequence and cams open a set of dust covers which operate to engage an opposing set of dust covers adjacent complementary type electrical connectors on the attachment mechanism. A mechanical and electrical interconnection process between the bodies occurs sequentially.

18 Claims, 5 Drawing Sheets

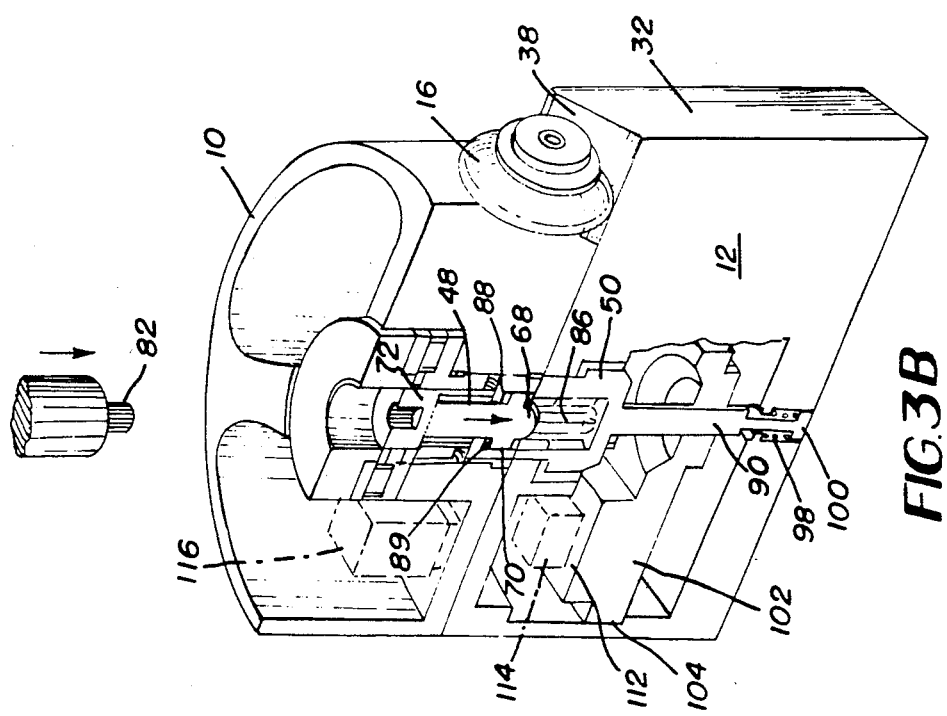
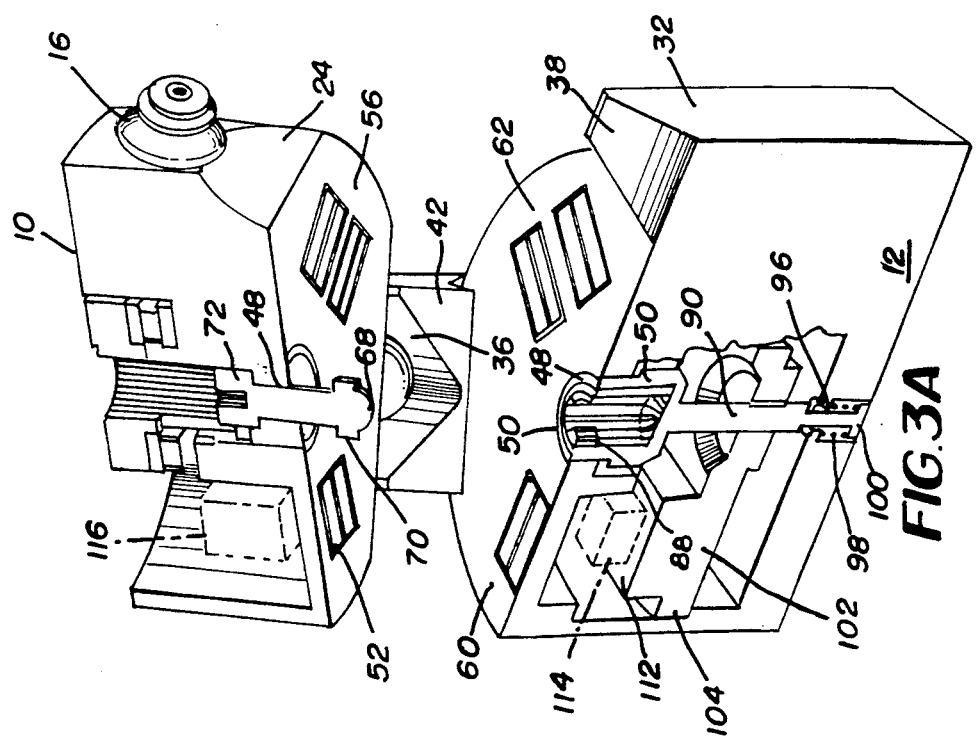

WORK ATTACHMENT MECHANISM/WORK ATTACHMENT FIXTURE

ORIGIN OF THE INVENTION

This invention was made by an employee of the United States Government and may be used by or for the Government for governmental purposes without the payment of any royalties thereon or therefor.

CROSS REFERENCE TO RELATED APPLICATION

This invention is related to an invention shown and described in U.S. Ser. No. 07/710,633 entitled, "Spline-Locking Payload Fastener" which was filed in the name of John M. Vranish, the present inventor, on Jun. 5, 1991, and which is assigned to the assignee of the present invention. Moreover, the teachings of this related application are herein meant to be incorporated by reference.

BACKGROUND OF THE INVENTION

This invention relates generally to attachment means for joining two bodies together and more particularly to a means for permitting a robot to berth and attach itself to a workpiece in outer space so that it can properly execute its assigned tasks.

DESCRIPTION OF THE PRIOR ART

Fasteners utilized to attach and release members of a robot are generally known. In an environment such as outer space, fasteners have special requirements irrespective of whether the attachment is made by way of a robot or an astronaut. In addition to having a requirement of being compact and light in weight, it above all must be relatively simple in construction and reliable in its operation.

In the above referenced related application, there is disclosed a locking spline payload fastener assembly utilized for joining two bodies in outer space. The fastener assembly is comprised of a spring-loaded male spline nut located at the tip of a threaded male positioning member that is affixed to a payload body which is to be fastened to a receiving body. A complementary female type spline fitting adapted to engage the spline nut is located at the lower end of a female conical receiving member which is affixed to the receiving body to which the payload body is being fastened. During a fastening guiding and mating procedure, the male nut and the female spline fitting are aligned first in a soft docking phase which is then followed by a forward movement of the spline nut into the female spline fitting. This is then followed by a rotation of the male spline nut into a locking arrangement with the female spline fitting. The fastener is released by simply reversing the process.

One other known design employs a plurality of over the center latches to hold a work attachment mechanism coupled to a work attachment fixture and which also incorporates a standard taper in a cone technique for positioning and guidance.

SUMMARY

Accordingly, it is an object of the present invention to provide an improved means for coupling one body to another body.

It is a further object of the invention to incorporate an improved system for interconnecting two bodies which have been precisely guided together.

It is another object of the invention to provide an improved system for coupling a work attachment mechanism to a work attachment fixture in outer space.

It is still a further object of the invention to incorporate electrical connector apparatus into a system which mechanically couples two bodies in a robotic system.

The foregoing and other objects are achieved by a spline screw system which is used to effect coupling between a work attachment mechanism and a work attachment fixture. Furthermore, the system includes a kinematic clamp to precisely guide and mate the two together. The kinematic clamp is comprised of three roller type members located equidistantly around the periphery of a joining interface of one of the mating members and three correspondingly located outwardly facing V shaped grooves located in a joining interface of the second mating member. Complementary electrical connectors are located on the two members and are joined together during the coupling process of the spline screw system. As one connector translates toward the other connector, respective adjacent dust covers are automatically opened. Upon disengagement, the dust covers are again closed, the connectors separate, and the work attachment mechanism and work attachment fixture part upon further actuation of the spline screw connecting system in the reverse direction.

BRIEF DESCRIPTION OF THE DRAWINGS

The following detailed description of the invention will be more readily understood when considered together with the accompanying drawings wherein:

FIGS. 3A-3D are partial cross sectional views of the two bodies shown in FIG. 1 during a coupling process therebetween;

DETAILED DESCRIPTION OF THE INVENTION

Figure 1:
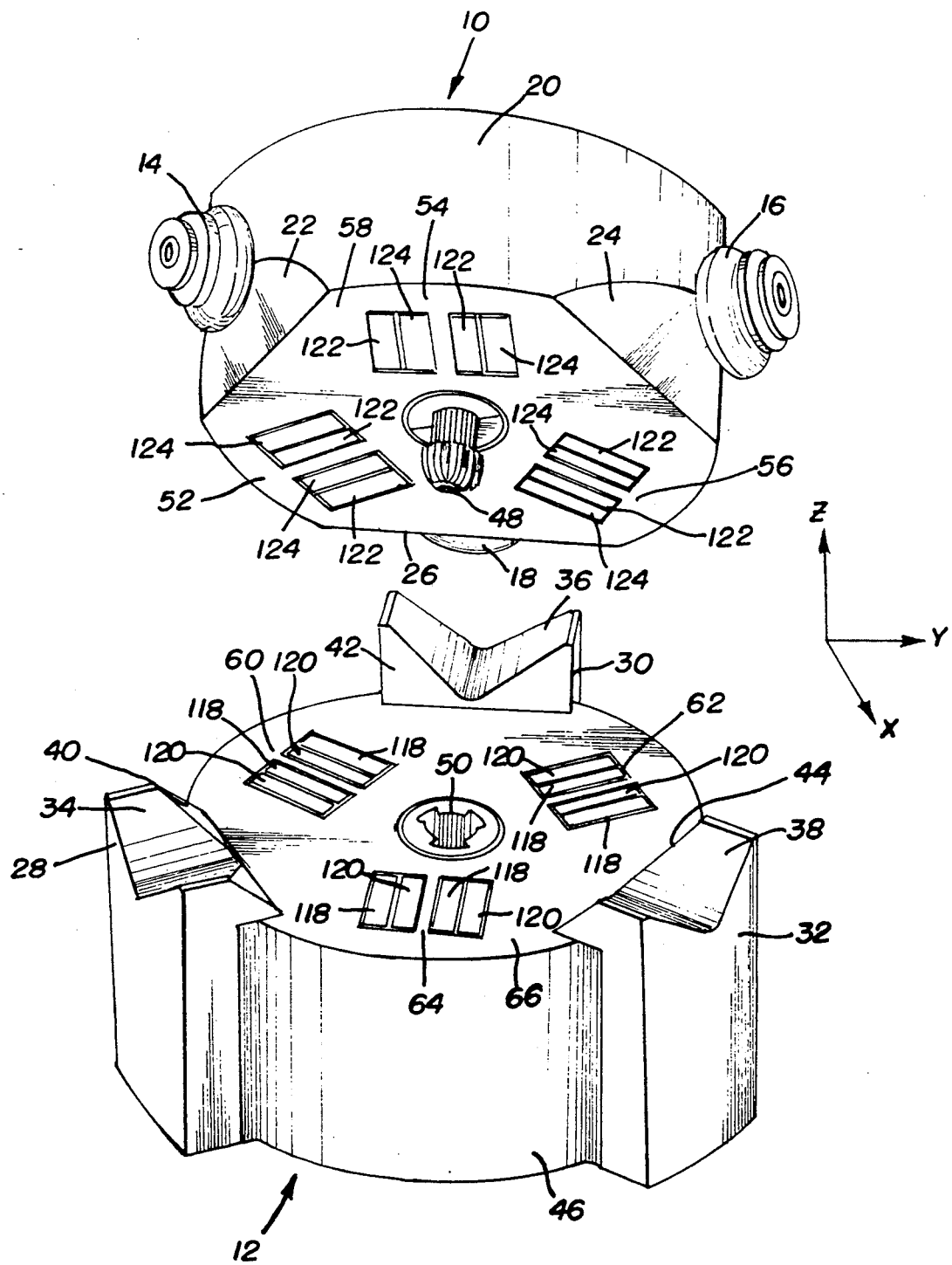
FIG. 1 is a perspective view of a work attachment mechanism body approaching a work attachment fixture body in a berthing maneuver.

Referring now to the drawings wherein like reference numerals refer to like parts throughout, reference will be first made to FIG. 1 where there is disclosed two generally cylindrical bodies, a work attachment mechanism (WAM) 10 which is attached to the leg of a robot, not shown, and the other a work attachment fixture (WAF) 12 which is attached to a work site, for example in outer space, also not shown. In a berthing and attachment sequence between the bodies, the work attachment mechanism 10 is first positioned in the vicinity of the work attachment mechanism 12 for docking by means of a remote manipulator system which may be located, for example, on a space station.

As an adjunct in the docking process, an automatic alignment system for the two bodies 10 and 12 includes three equally spaced round roller type members 14, 16 and 18 which are rotatably mounted on the cylindrical outer surface 20 of the work attachment mechanism 10 adjacent respective leading chamfered surfaces 22, 24 and 26. The work attachment fixture 12 below includes a complementary mating structure comprised of three mounting blocks 28, 30 and 32 having upwardly directed V-shaped grooves 34, 36 and 38 which are coextensive with adjacent chamfered surfaces 40, 42 and 44. As shown, the mating blocks 28, 30 and 32 are equidistantly arranged on the outer surface 46 of the work attachment fixture 12 to match the separation of the roller members 14, 16 and 18.

In a berthing maneuver, the chamfered surfaces 22, 24 and 26 provide an initial rough alignment along the X and Y axes following which one or more of the roller members 14, 16 or 18 of the work attachment mechanism 10 contact a respective outwardly radiating V-shaped mating groove 34, 36, 38 of the work attachment fixture 12 to provide a final alignment about all three axes. This provides an automatic berthing capability for a spline screw coupling and locking mechanism for the two bodies 10 and 12 and consisting of a male spline type driver element 48, and a female spline type receptor and bolt member 50, the details of which are shown in FIG. 2.

Surrounding the spline connector elements 48 and 50 are three sets of fold back door type dust covers 52, 54 and 56, which are located on the underside 58 of the work attachment mechanism 10 and three mutually opposite sets of dust covers 60, 62 and 64 located on the upper surface 66 of the work attachment fixture 12. The dust covers 52, 54, 56 and 60, 62, 64 automatically open and close as will be explained and act to protect complementary sets of electrical conductors which are interconnected in a manner as shown in FIGS. 3A-3D.

Figure 2:
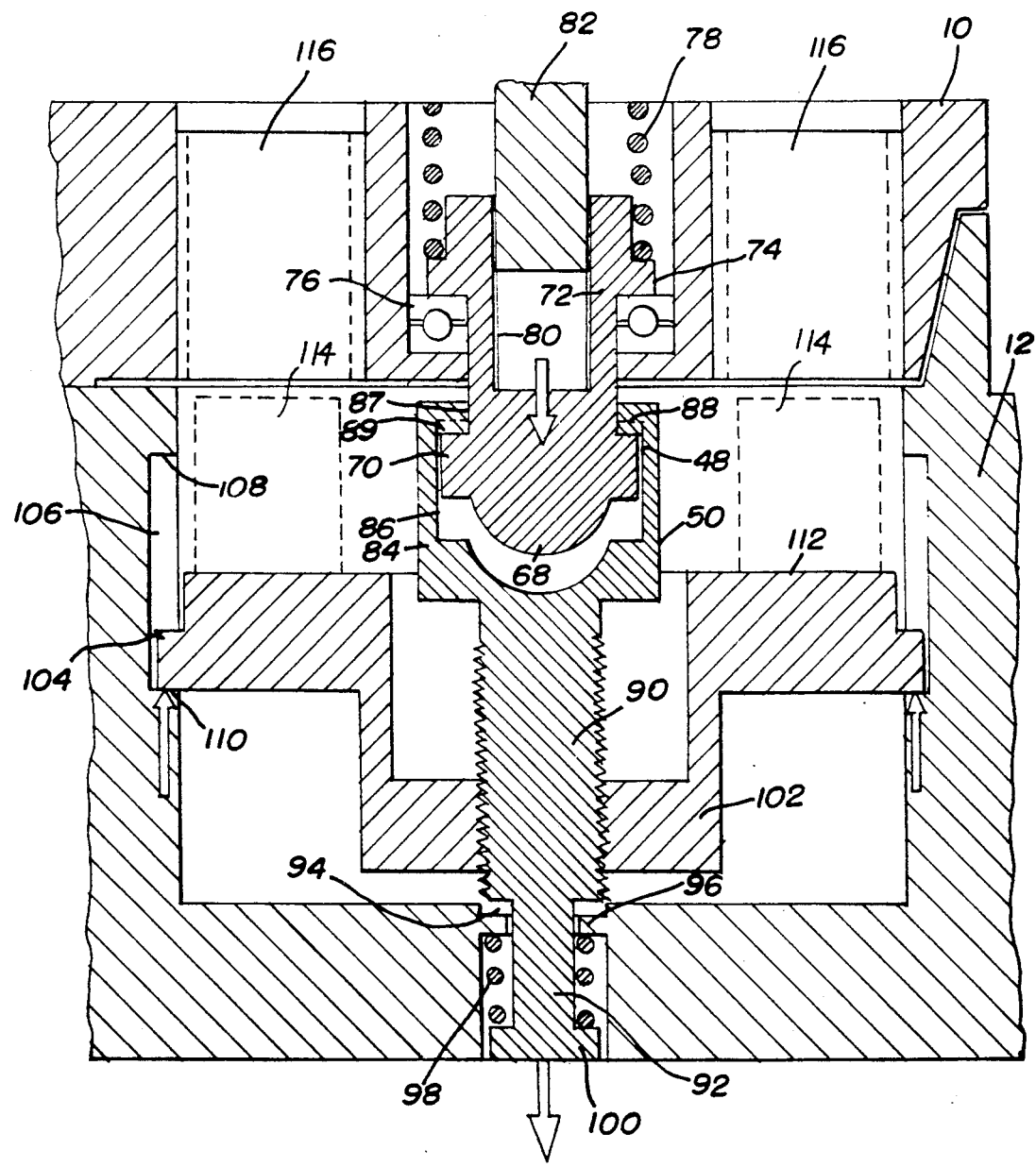
FIG. 2 is a partial central cross sectional view of the spline screw system used to couple the two bodies together shown in FIG. 1.

Referring now to FIG. 2, shown thereat is a vertical cross section generally illustrative of the spline screw coupling mechanism including, among other things, the male spline driver 48 and the female spline receptor and bolt 50. As shown, the driver element 48 includes a head 68 having a plurality of radially projecting spline members 70. These members adjoin a hollow shank portion 72 which includes a rear shoulder 74 that abuts a thrust bearing 76 and a compliance spring 78. The shank 72 includes an axial bore 80 which is adapted to receive the splined shaft 82 (FIG. 3B) of a drive motor, not shown.

The spline receptor and bolt 50 is comprised of a hollow upper body member 84 which includes a splined inner surface 86 and an opening 87 for the passage of the driver head 68 therethrough. An undercut surface 88 is located at the top as further shown in FIGS. 4A and 4B. The body 84 is joined to a threaded bolt portion 90 which narrows at its lower end 92 where it passes through a recess 94 and hole 96 in the work attachment fixture 12 and is surrounded by a preload bias spring 98 and held in place by an enlarged butt end portion 100.

A threaded nut body 102 is located on the threaded bolt portion 90. The nut 102 is permitted to move axially up and down the bolt 90 but is constrained from rotation by one or more spline guides 104 which ride up and down in respective vertical channels 106 between top and bottom stops 108 and 110.

The nut body 102 is shown comprised of an angulated member having an upper surface 112 on which is located a set of male type electrical connectors 114, shown in phantom view, around the periphery thereof and which are adapted to engage a respective set of female type electrical connectors 116, also shown in phantom view, located directly above in the work attachment mechanism 10. Associated with both sets of electrical connectors 114 and 116 are respective sets of dust covers 52, 54, 56 and 60, 62, 64, one set of which 52 and 60 are shown schematically in FIG. 5. The dust covers are adapted to open and close automatically when the electrical connectors are brought together, as will be explained.

Figure 3C:
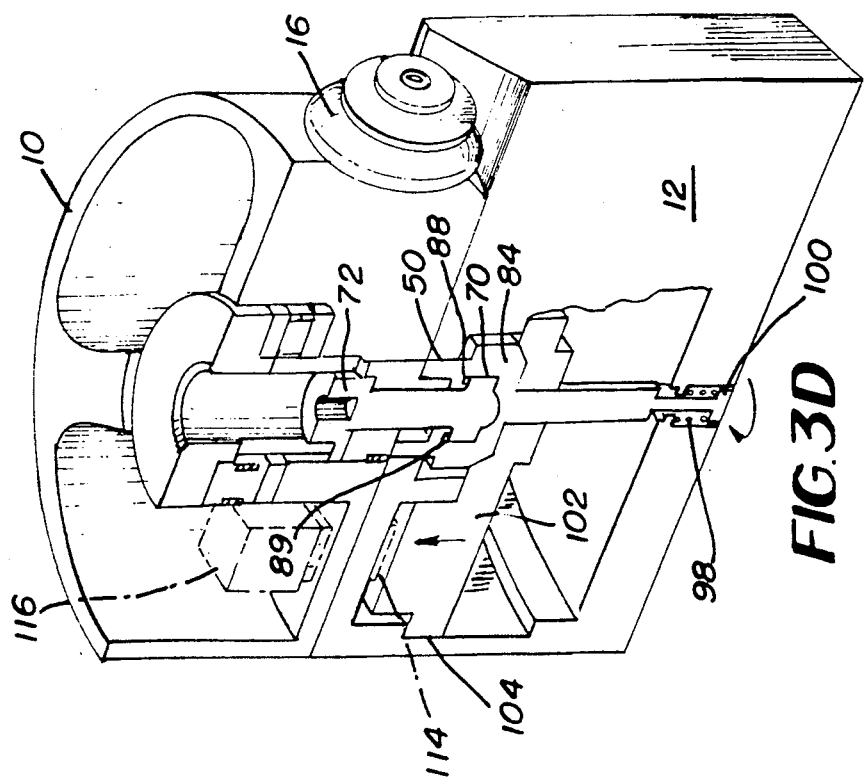
Figure 3D:
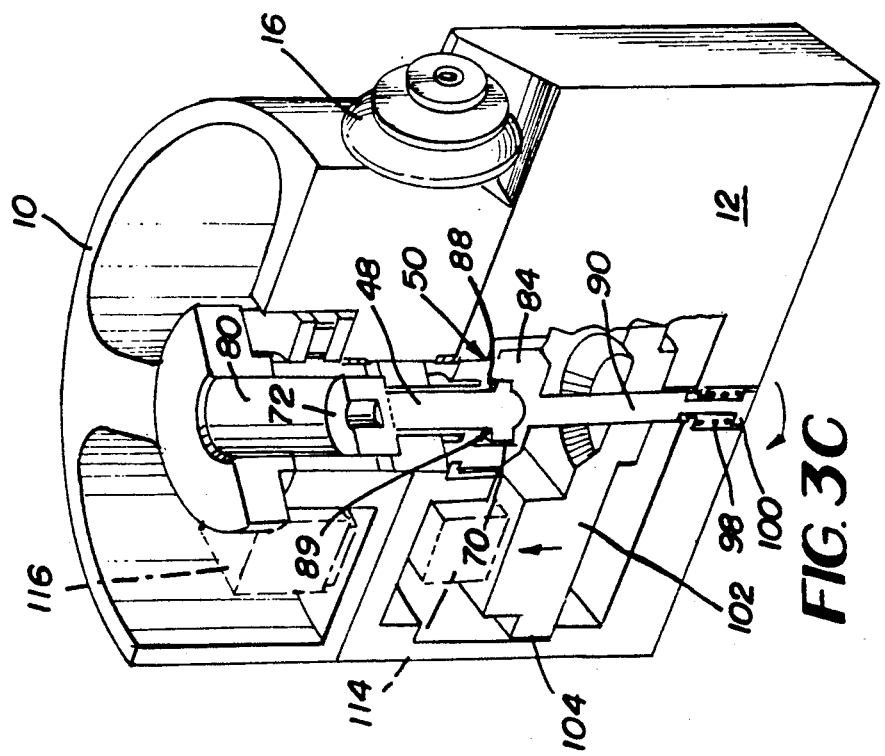
Figure 4A:
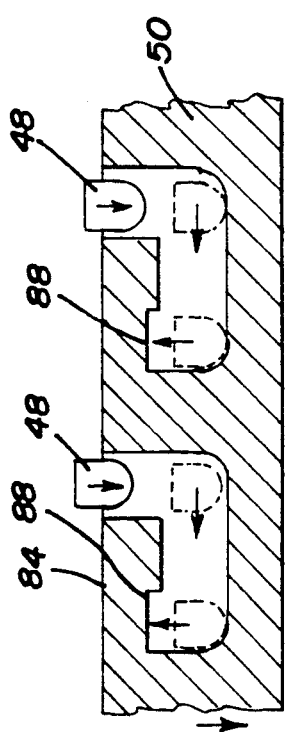
FIGS. 4A and 4B are partial sectional diagrams illustrative of the spline locking and disconnecting process of the system shown in FIG. 3.

Referring now collectively to FIGS. 3A-3D and 4A-4B, as soon as the two bodies 10 and 12 have seated as shown in FIG. 3B, the spring loaded male spline driver 48 drops down into the cavity of the female spline body 50, as shown in FIG. 4A, thereby creating a soft dock condition. A small gap 89 (FIG. 3B), typically 0.020 in., exists between the top of the spline portion 70 and the undercut surface 88. The two members 48 and 50 cannot now be pulled apart without causing a structural failure in the locking splines.

As the male spline driver is rotated clockwise, as shown in FIG. 3C, it engages the sides 86 of the female spline member 50, the bolt portion 90, however, is spring loaded against the casing 12 by the spring 98. Since the threaded nut member 102 which engages the threaded bolt portion 90 is splined at its circumference as shown by reference numeral 104, it can move up and down but cannot rotate. As a result, as the female spline member 50 rotates, a relative translation is caused between the bolt portion 90 and the nut member 102. Initially, this structural arrangement causes the nut 102 to remain in place and the bolt to translate downward, as shown in FIG. 4A, until the gap 89 is closed and the splines lock. Following this, the spring load shifts from the bottom of the nut 102 to the interface between the locking splines 48 and 50 so that the bolt portion 90 can no longer translate downwardly. Accordingly, the nut begins to travel upwardly as shown in FIG. 3C; however, just before this happens, the structural members 10 and 12 lock together and align with the force of preload spring 98.

Figure 5:
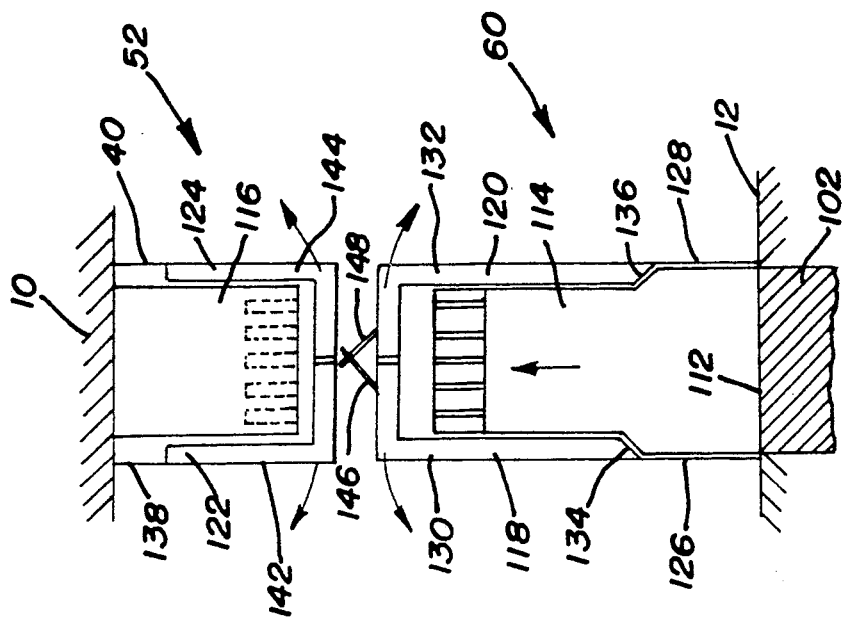
FIG. 5 is a mechanical schematic diagram illustrative of the complementary type electrical connectors and dust covers which operate with the electrical connection shown in FIG. 2

Referring now to briefly to FIG. 5, what is schematically illustrated there is that both sets of dust covers 52 and 60 are comprised of pairs of cover elements 118, 120 and 122, 124, respectively. The dust cover elements 118 and 120 associated with the male connector 114 include thin steel spring portions 126 and 128 which are secured to the work attachment fixture body 12 and terminate in upper side walls 130 and 132 having cam surfaces 134 and 136. In operation, when the nut member 102 rises, the male connector element 114 cams the side walls 130 and 132 open, which splay apart as shown. The upper dust cover elements 122 and 124 are similar in that they also include thin steel base members 138 and 140 which terminate in relatively larger side walls 142 and 144. The upper dust cover elements 122 and 124 are pushed apart by actuator members 146 and 148 which are secured to the upper portion of the dust cover elements 118 and 120. This now permits the upwardly driven male connector 114 to mate with the opposing female connector 116. This operation provides a precise electrical connection with no practical limit to the connector pin insertion force it can achieve. When the connectors 114 and 116 make contact, the upward travel of the connector 114 is terminated by the shoulder stop 108 (FIG. 2).

Figure 4B:
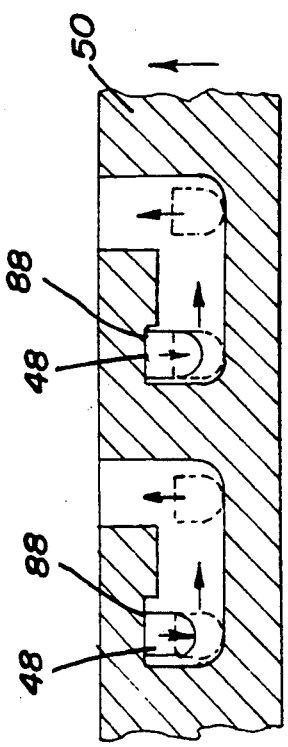

In the disengagement and removal process, the above mentioned procedure is merely reversed. First the preload forces between the bodies 10 and 12 are relaxed and the male connectors 114 are pulled free of the female connectors 116. As the nut 102 travels downward, the dust cover elements 118, 120, and 122, 124 again snap shut. The nut 102 then bottoms on the inner surface of the casing 12 and its downward travel is stopped. This is followed by the female spline body portion 50 attempt to translate upward as shown in FIG. 4B. In doing so, the small gap 89 between the spline sections 48 and 50 reappears. Further as shown in FIG. 4B, the spline driver 48 rotates a small portion of a turn with respect to the female spline portion 50 until a mutual separation between the two sets of splines is permitted allowing the two bodies 10 and 12 to be pulled apart without resistance.

Thus what has been shown and described is an improved means for permitting a robot in space, for example, to dock and attach itself to a workpiece for performing a predetermined operation.

Having thus shown and described what is at present considered to be the preferred embodiment of the invention, it should be noted that the same has been made by way of illustration and not limitation. Accordingly, all modifications, alterations and changes coming within the spirit and scope of the invention as set forth in the appended claims are herein meant to be included.

I claim:

1. A system for mechanically and electrically coupling two bodies, comprising:
    a first body comprising a work attachment mechanism including first type spline connecting means selectively located thereon;
    a second body comprising a work attachment fixture, second type spline connecting means positioned thereon to mate with said first type spline connecting means;
    first type alignment mans exteriorally located on said first body for berthing with said second body;
    second type alignment means exteriorally located on said second body for receiving said first type alignment means;
    said second type spline connecting means including a threaded bolt member having a captured nut member located thereon which can translate up and down the bolt but is constrained from rotation thereabout;
    said nut member having a mounting surface;
    at least one first type electrical connector located on said mounting surface for translating to and from said first body;
    at least one complementary second type electrical connector on said first body for mating with said at least one first type electrical connector on the mounting surface of said nut member,
    whereby when said first type spline connecting means mates with said second type connecting means and is driven, both said spline connecting means lock together and said nut member translates up the threaded bolt member carrying said first type electrical connector up to said complementary second type connector for interconnection therewith; and
    dust cover means located adjacent both said electrical connectors for protecting said connectors, said dust cover means operating to automatically open and shut in response to electrical connector translation.

2. The system of claim 1 wherein said first type spline connecting means comprise male type spline means and said second type spline connecting means comprises female type spline means.

3. The system of claim 2 wherein said male type spline means comprises a driver element which includes a forwardly biased body member having a splined head for engaging said female type spline means and means located at the rear portion thereof for receiving a rotating member which operates to impart a driving force to the splined head.

4. The system of claim 3 and additionally including a compression spring means contacting said body member for applying a forward biasing force thereto.

5. The system of claim 4 wherein said female type spline means includes a generally hollow spline receptor member adjoining said threaded bolt member at one end thereof and having an opening for the passage of said head of said driver element therethrough and further having a splined inside wall surface for engaging said splined head.

6. The system of claim 5 wherein said receptor member includes an undercut in the top inside surface thereof for engaging a top portion of said splined head when said spline connecting means lock together.

7. The system of claim 6 and additionally including spring preloading means located between a body portion of said second body and said threaded bolt member.

8. The system of claim 7 wherein preloading means comprises a compression spring located at one end of said threaded bolt member.

9. The system of claim 8 wherein the spline receptor member is located at the upper end of said threaded bolt member and said preload compression spring is located at the lower end of said threaded bolt member.

10. The system of claim 5 wherein said nut member includes splines selectively located on a side surface thereof which extend into respective vertical channels formed in a side portion of said second body for preventing rotation of nut member.

11. The system of claim 10 wherein vertical channels have ends defining top and bottom stops of nut member translation.

12. The system of claim 12 wherein said dust cover means comprises pairs of cover elements.

13. The system of claim 13 wherein the pair of cover elements adjacent said first type electrical connector comprises spring biased members having respective cam surfaces for being cammed open by a body portion of said first type connector.

14. The system of claim 13 wherein the pair of cover elements adjacent said second type electrical connector comprises spring biased members actuated by the opening of the cover elements adjacent said first type connector.

15. The system of claim 14 wherein said pair of cover elements adjacent said first type electrical connector includes means for opening said pair of cover elements adjacent said second type electrical connector.

16. A system for mechanically and electrically coupling two bodies, comprising:
    a first body comprising a work attachment mechanism including first type spline connecting means selectively located thereon;
    a second body comprising a work attachment fixture, second type spline connecting means positioned thereon to mate with said first type spline connecting means;
    first type alignment mean exteriorally located on said first body for berthing with said second body;

second type alignment means exteriorly located on said second body for receiving said first type alignment means;

said second type spline connecting means including a threaded bolt member having a captured nut member located thereon which can translate up and down the bolt but is constrained from rotation thereabout;

said nut member having a mounting surface;

at least one first type electrical connector located on said mounting surface for translating to and from said first body;

at least one complementary second type electrical connector on said first body for mating with said at least one first type electrical connector on the mounting surface of said nut member, whereby when said first type spline connecting means mates with said second type connecting means and is driven, both said spline connecting means lock together and said nut member translates up the threaded bolt member carrying said first type electrical connector up to said complementary second type connector for interconnection therewith; and said first type alignment means comprises a set of roller members located at the side of said first body and said second type alignment means comprises a set of members at the side of said second body having complementary seating surfaces for said roller member.

17. The system of claim 16 and additionally including chamfer type surfaces located adjacent said roller members and said complementary seating surfaces.

18. The system of claim 17 wherein said seating surfaces comprise mutually diverging inclined seating surfaces.

* * * * *